United States Patent [19]

Reiboldt et al.

[11] Patent Number: 5,305,920

[45] Date of Patent: Apr. 26, 1994

[54] BAG-IN-BOTTLE PACKAGE WITH REUSABLE RESILIENT SQUEEZE BOTTLE AND DISPOSABLE INNER RECEPTACLE WHICH INVERTS UPON EMPTYING WITHOUT ATTACHMENT NEAR ITS MIDPOINT TO SQUEEZE BOTTLE

[75] Inventors: H. Norman Reiboldt, College Corner; Ronald W. Kock, Wyoming; Nancy J. McCarthy, Cincinnati, all of Ohio; Reuben E. Oder, Florence, Ky.

[73] Assignee: The Procter & Gamble Company, Cincinnati, Ohio

[21] Appl. No.: 795,213

[22] Filed: Nov. 20, 1991

[51] Int. Cl.$^5$ ............................................. B65D 35/28
[52] U.S. Cl. ............................ 222/95; 222/105; 222/212; 222/325; 222/386.5
[58] Field of Search ............... 222/105, 95, 94, 183, 222/206, 209, 212, 325, 386.5, 390, 327

[56] References Cited

U.S. PATENT DOCUMENTS

| | | | |
|---|---|---|---|
| Re. 32,383 | 3/1987 | Banks et al. ........................ | 53/449 |
| 1,352,238 | 9/1920 | Arthur ................................. | 220/8 |
| 1,457,895 | 6/1923 | Campanella . | |
| 1,965,271 | 7/1934 | Wharton ............................. | 221/47.3 |
| 2,556,584 | 6/1951 | Hofmann ............................ | 222/105 |
| 2,564,359 | 8/1951 | Fuller ................................. | 222/105 |
| 2,608,320 | 8/1952 | Harrison, jr. ...................... | 222/95 |
| 2,671,579 | 3/1954 | Knoblock ........................... | 222/105 |
| 2,804,240 | 8/1957 | Anderson ........................... | 222/207 |
| 2,804,995 | 9/1957 | Fee ..................................... | 222/95 |
| 2,859,899 | 11/1958 | Kramer et al. .................... | 222/95 |
| 3,022,920 | 2/1962 | Croom, Jr. ........................ | 222/105 |
| 3,039,644 | 6/1962 | Lefcort .............................. | 220/20 |
| 3,118,572 | 1/1964 | Harding ............................. | 222/183 |
| 3,172,568 | 3/1965 | Modderno ......................... | 222/80 |
| 3,178,060 | 4/1965 | Bossack ............................. | 222/78 |
| 3,223,289 | 12/1965 | Bouet ................................. | 222/209 |
| 3,225,967 | 12/1965 | Heimgartner ..................... | 222/183 |
| 3,240,394 | 3/1966 | Modderno ......................... | 222/95 |

(List continued on next page.)

FOREIGN PATENT DOCUMENTS

| | | | |
|---|---|---|---|
| 961015 | 1/1975 | Canada .............................. | 222/87 |
| 0182094 | 5/1986 | European Pat. Off. . | |
| 1042850 | 6/1954 | Fed. Rep. of Germany . | |
| 188643 | 1/1957 | Fed. Rep. of Germany . | |
| 2129736 | 6/1971 | Fed. Rep. of Germany . | |
| 658903 | 6/1929 | France .............................. | 222/94 |
| 2134871 | 12/1972 | France . | |
| 1255159 | 6/1991 | France . | |
| 133748 | 6/1991 | Japan ................................. | 222/95 |
| 86/00868 | 2/1986 | PCT Int'l Appl. . | |
| 1132709 | 11/1968 | United Kingdom . | |
| 2184491 | 6/1987 | United Kingdom .............. | 222/105 |

Primary Examiner—Andres Kashnikow
Assistant Examiner—Philippe Derakshani
Attorney, Agent, or Firm—E. Kelly Linman; Michael E. Hilton; John M. Howell

[57] ABSTRACT

An inner receptacle is provided which is adapted to be used with a resilient squeeze bottle. The inner receptacle includes a flexible bag and includes a mechanism for causing the flexible bag to invert upon itself about its midpoint without requiring attachment of the inner receptacle to the squeeze bottle. The inversion enables substantially all of the product within the receptacle to be dispensed. One preferred mechanism for causing inversion is a support frame which resembles a bird cage. This support frame may be located inside or outside the top half of the flexible bag. Such inner receptacles offer special advantages when utilized with reusable squeeze bottles. The reusable squeeze bottles may be oval and include an opening at the top which accommodates the dispensing opening of the inner receptacle and an opening at the bottom end through which the entire inner receptacle may pass. An end plate is utilized to seal the bottom end of the squeeze bottle. One preferred squeeze bottle includes an inner sleeve and an outer sleeve which enables replacement of the inner receptacle while manipulating only one closure element.

4 Claims, 13 Drawing Sheets

U.S. PATENT DOCUMENTS

| | | | |
|---|---|---|---|
| 3,240,399 | 3/1966 | Frandeen | 222/211 |
| 3,245,582 | 4/1966 | Roth et al. | 222/4 |
| 3,270,920 | 9/1966 | Nessler | 222/95 |
| 3,275,193 | 9/1966 | Barr | 222/1 |
| 3,294,289 | 12/1966 | Bayne et al. | 222/95 |
| 3,297,205 | 1/1967 | Sumner | 222/102 |
| 3,306,500 | 2/1967 | Williams | 222/209 |
| 3,313,455 | 4/1967 | Kemmer | 222/103 |
| 3,342,377 | 9/1967 | Peredy | 222/94 |
| 3,486,661 | 12/1969 | Friedrich et al. | 222/95 |
| 3,493,179 | 2/1970 | Lee | 239/327 |
| 3,587,937 | 6/1971 | Childs | 222/213 |
| 3,592,365 | 7/1971 | Schwartzman | 222/209 |
| 3,648,903 | 3/1972 | Marchant | 222/212 |
| 3,656,660 | 4/1972 | Mueller | 222/94 |
| 3,709,437 | 1/1973 | Wright | 239/343 |
| 3,726,436 | 4/1973 | Despain et al. | 222/213 |
| 3,837,533 | 9/1974 | Splan | 222/94 |
| 3,870,198 | 3/1975 | Cohen | 222/105 |
| 3,876,119 | 4/1975 | Lamkin | 222/386.5 |
| 3,896,970 | 7/1975 | Laauwe | 222/94 |
| 3,938,709 | 2/1976 | Collar | 222/95 |
| 3,973,701 | 8/1976 | Gardner | 222/190 |
| 3,995,772 | 12/1976 | Liautaud | 222/83.5 |
| 4,013,195 | 3/1977 | Ferris | 222/95 |
| 4,020,978 | 5/1977 | Szczepanski | 222/209 |
| 4,057,177 | 11/1977 | Laauwe | 222/215 |
| 4,062,475 | 12/1977 | Harris et al. | 222/95 |
| 4,087,023 | 5/1978 | Szczepanski | 222/209 |
| 4,098,434 | 7/1978 | Uhlig | 222/94 |
| 4,102,476 | 7/1978 | Loeffler | 222/209 |
| 4,138,036 | 2/1979 | Bond | 222/105 |
| 4,139,124 | 2/1979 | Ferrante | 222/110 |
| 4,147,278 | 4/1979 | Uhlig | 222/94 |
| 4,147,306 | 4/1979 | Bennett | 239/327 |
| 4,154,366 | 5/1979 | Acres | 222/95 |
| 4,159,790 | 7/1979 | Bailey | 222/211 |
| 4,213,545 | 7/1980 | Thompson et al. | 222/386.5 |
| 4,266,698 | 5/1981 | Rausing | 222/528 |
| 4,286,636 | 9/1981 | Credle | 141/114 |
| 4,286,735 | 9/1981 | Sneider | 222/189 |
| 4,295,582 | 10/1981 | Acres | 222/213 |
| 4,322,020 | 3/1982 | Stone | 222/95 |
| 4,340,157 | 7/1982 | Darner | 222/211 |
| 4,428,508 | 1/1984 | Gardikas et al. | 222/153 |
| 4,469,250 | 9/1984 | Evezich | 222/83.5 |
| 4,513,891 | 4/1985 | Hain et al. | 222/213 |
| 4,562,942 | 1/1986 | Diamond | 222/386.5 |
| 4,620,648 | 11/1986 | Schwartzman | 222/490 |
| 4,657,151 | 4/1987 | Cabernoch | 215/11 E |
| 4,671,428 | 6/1987 | Spatz | 222/105 |
| 4,730,751 | 3/1988 | Mackles et al. | 222/189 |
| 4,760,937 | 8/1988 | Evezich | 222/95 |
| 4,776,492 | 10/1988 | Gallo | 222/183 |
| 4,785,974 | 11/1988 | Rudick et al. | 222/105 |
| 4,809,884 | 3/1989 | Stackhouse | 222/153 |
| 4,842,165 | 6/1989 | Van Coney | 222/95 |
| 4,865,224 | 9/1989 | Streck | 222/95 |
| 4,909,416 | 3/1990 | Evezich | 222/95 |
| 4,936,490 | 6/1990 | Battegazzore | 222/205 |
| 4,949,871 | 8/1990 | Flanner | 222/95 |
| 5,004,123 | 4/1991 | Stoody | 222/94 |
| 5,005,733 | 4/1991 | Stoody | 222/105 |
| 5,012,956 | 5/1991 | Stoody | 222/94 |
| 5,156,299 | 10/1992 | De Glowe et al. | 222/105 |

BAG-IN-BOTTLE PACKAGE WITH REUSABLE RESILIENT SQUEEZE BOTTLE AND DISPOSABLE INNER RECEPTACLE WHICH INVERTS UPON EMPTYING WITHOUT ATTACHMENT NEAR ITS MIDPOINT TO SQUEEZE BOTTLE

BACKGROUND OF THE INVENTION

1. Field of the Invention

The present invention relates to bag-in-bottle packages which include a resilient squeeze bottle and and inner receptacles incorporating a flexible bag for housing a viscous product, and more particularly, to such inner receptacles which include a flexible product bag which inverts upon emptying.

2. Description of the Prior Art

A wide variety of packages are known which include an outer squeeze bottle and an inner flexible product bag. Generally, the outer squeeze bottle includes a resilient side wall portion which when compressed, forces product from the bag through a dispensing passage. The dispensing passage generally includes a valve which prevents air from entering the product bag when the outer squeeze bottle is released. The squeeze bottle also generally includes a second valve which enables air to re-enter the outer squeeze bottle into the space located between the inner flexible product bag and outer squeeze bottle. Consequently, the inner product bag collapses as product is dispensed. One problem with such packages is that the inner flexible bag has a tendency to collapse prematurely; trapping product within the inner flexible bag so it cannot be dispensed.

One method to ensure that product is not trapped inside the inner flexible bag is to provide a mechanism for causing the bag to invert about its midpoint. U.S. Pat. No. 2,608,320, issued to Harrison on Aug. 26, 1952, discloses such a package which provides for bag inversion. This package requires that a thinner, flexible, lower bag portion be sealed to an upper, thicker, rigid, bag portion around the entire curved circumferential surface of the bag in an air tight manner. However, complete sealing along such a curved surface is difficult to accomplish; particularly when utilizing heat sealing. In addition, the rigid top portion is not resilient such that it is squeezable. Thus, the user is only able to squeeze the bottom portion of the package.

Commonly assigned U.S. Pat. No. 4,842,165 which issued on Jun. 27, 1989 to Van Coney discloses a package which includes an inner receptacle having a flexible product bag. The bag of the inner receptacle is secured to the interior surface of the side wall of the outer squeeze bottle about its midpoint to provide bag inversion. In the illustrated embodiments of the Van Coney invention the inner receptacle is secured by attachment of its outermost surface to the innermost surface of the squeeze bottle; preferably by means of adhesive or by heat sealing.

SUMMARY OF THE INVENTION

In accordance with one aspect of the present invention a squeeze bottle package is provided which includes a reusable outer squeeze bottle and a replaceable inner receptacle. The inner receptacle includes a flexible bag which has a dispensing passage. In addition, the flexible bag is adapted to house a viscous product and the inner receptacle is adapted to cause the flexible bag to invert upon itself substantially about its midpoint.

The squeeze bottle package includes an outer squeeze bottle which has a resiliently deformable side wall, an opening at the top end of the squeeze bottle adapted to accommodate the dispensing passage of the inner receptacle, and an opening at the bottom end of the squeeze bottle adapted to permit the insertion of the entire inner receptacle therethrough. Also, included is a sealing closure means for repeatedly sealing the inner receptacle within the outer squeeze bottle such that the dispensing passage of the inner receptacle provides communication with the opening at the top end of the outer squeeze bottle to permit the product to be dispensed therethrough. A vent valve is provided which is located in the outer squeeze bottle. The vent valve is adapted, when the inner receptacle is sealed therein, to substantially prevent air located between the inner receptacle and the squeeze bottle from exiting the package when a squeezing force is applied to the resilient side wall so that product is dispensed form the package through the discharge passage. In addition, the vent valve is adapted to permit air to enter the space between the inner receptacle and the squeeze bottle upon release of the squeezing force.

In accordance with another aspect of the present invention a squeeze bottle package is provided which is similar to the squeeze bottle package discussed above. However, the sealing closure means is a single sealing closure means. This single sealing closure means repeatedly seals the top end of the inner receptacle within the outer squeeze bottle such that the dispensing passage of the inner receptacle provides communication with the opening at the top end of the outer squeeze bottle to permit the product to be dispensed therethrough. In addition, this single sealing closure means simultaneously repeatedly seals the bottom end of the outer squeeze bottle.

In accordance with another aspect of the present invention a squeeze bottle package is provided which is also similar to the squeeze bottle packages discussed. However, instead of a single sealing closure means, a top closure means and a separate bottom closure means are provided. The top closure means repeatedly seals the top end of the inner receptacle to the top end of the outer squeeze bottle such that the dispensing passage of the inner receptacle provides communication with the opening at the top end of the outer squeeze bottle to permit product to be dispensed therethrough. The separate bottom closure means repeatedly seals the bottom end of the outer squeeze bottle.

BRIEF DESCRIPTION OF THE DRAWINGS

While the specification concludes with claims which particularly point out and distinctly claim the invention, it is believed the present invention will be better understood from the following description of preferred embodiments taken in conjunction with the accompanying drawings, in which like reference numerals identify identical elements and wherein;

DESCRIPTION OF THE PREFERRED EMBODIMENT

Figure 1:
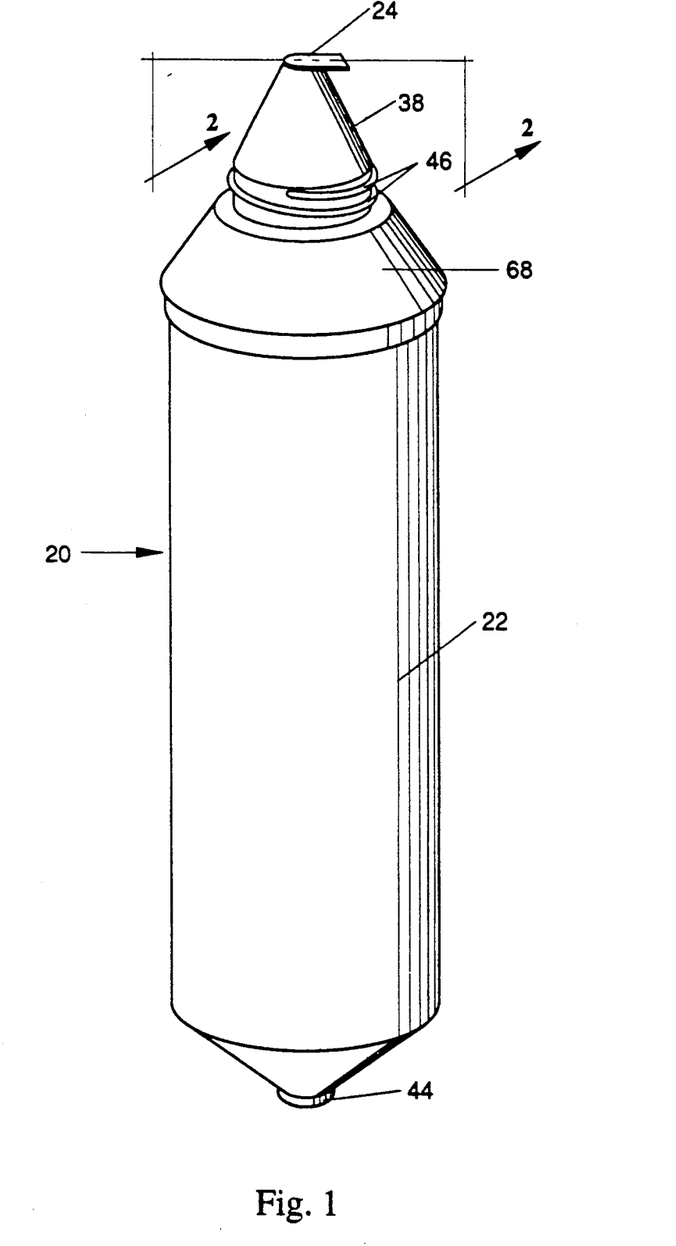
FIG. 1 is a perspective view of a particularly preferred embodiment of an inner receptacle the support frame is located inside the flexible bag.

The particularly preferred inner receptacle shown in FIG. 1, and indicated generally as 20, is adapted for use with a squeeze bottle 25 (seen in FIG. 8) of the present invention. The inner receptacle includes a flexible bag 22 which inverts about its midpoint without requiring attachment at or near its midpoint to the side walls of the squeeze bottle 25. The general operational theory and structure of a package which includes a resilient squeeze bottle and an inner receptacle including a flexible bag which inverts upon emptying is disclosed in U.S. Pat. No. 4,842,165, issued to Van Coney on Jun. 27, 1989; the disclosure of which is hereby incorporated herein by reference.

Figure 2:
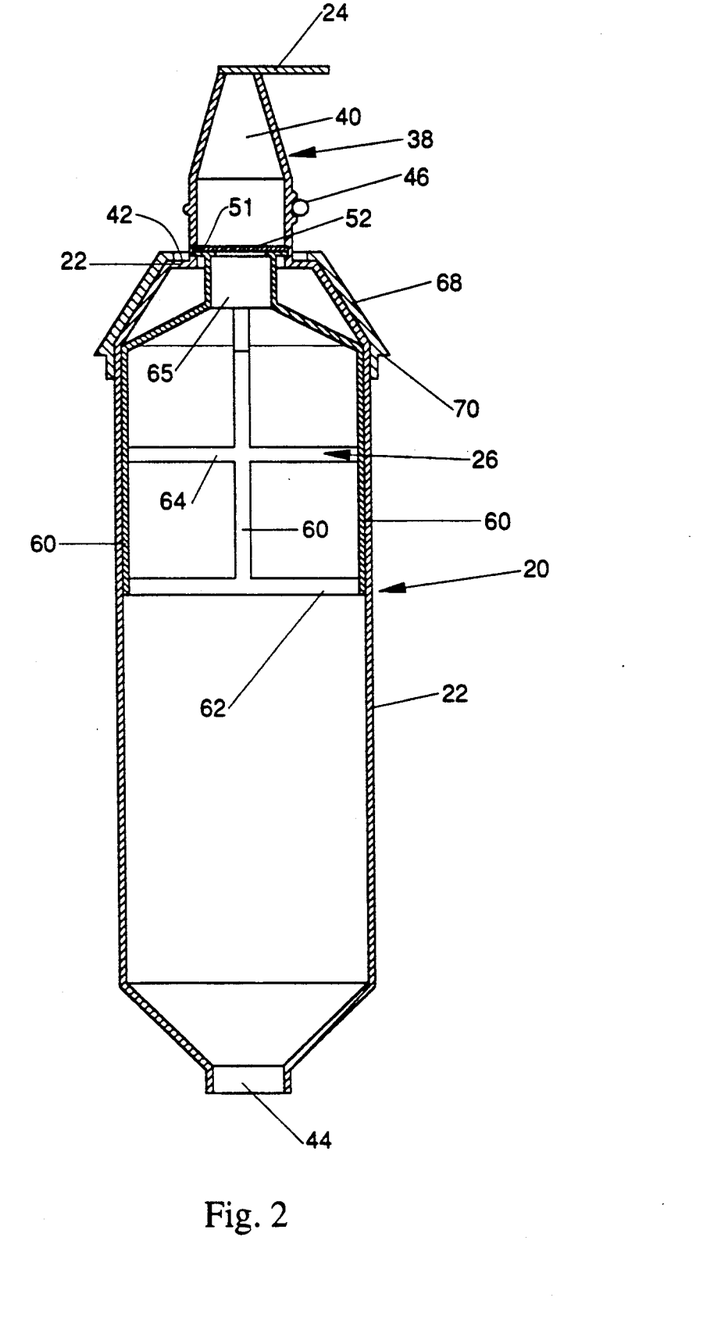
FIG. 2 is a cross-sectional view of the receptacle of FIG. 1, taken along line 2—2 of FIG. 1.

Referring to FIG. 2, the receptacle 20 generally includes a closure 24, a support frame 26 and a thin walled flexible bag 22 adapted to house a viscous product. The flexible bag 22 is preferably a full length thin walled flexible bag 22. As used herein to describe the flexible bag 22, the term "full length" is intended to connote that the flexible bag 22 has a top half above, and a bottom half below, the approximate midpoint of the flexible bag 22 without any intermediate transverse seals; and it is the bottom half which inverts inside the top half as product empties from the receptacle 20. The top half of the flexible bag 22 is maintained in substantially its original, filled shape between dispensing operations by the support frame 26 without attachment of the receptacle 20 to the squeeze bottle 25 near the midpoint of the receptacle 20 as discussed hereinafter.

Figure 3:
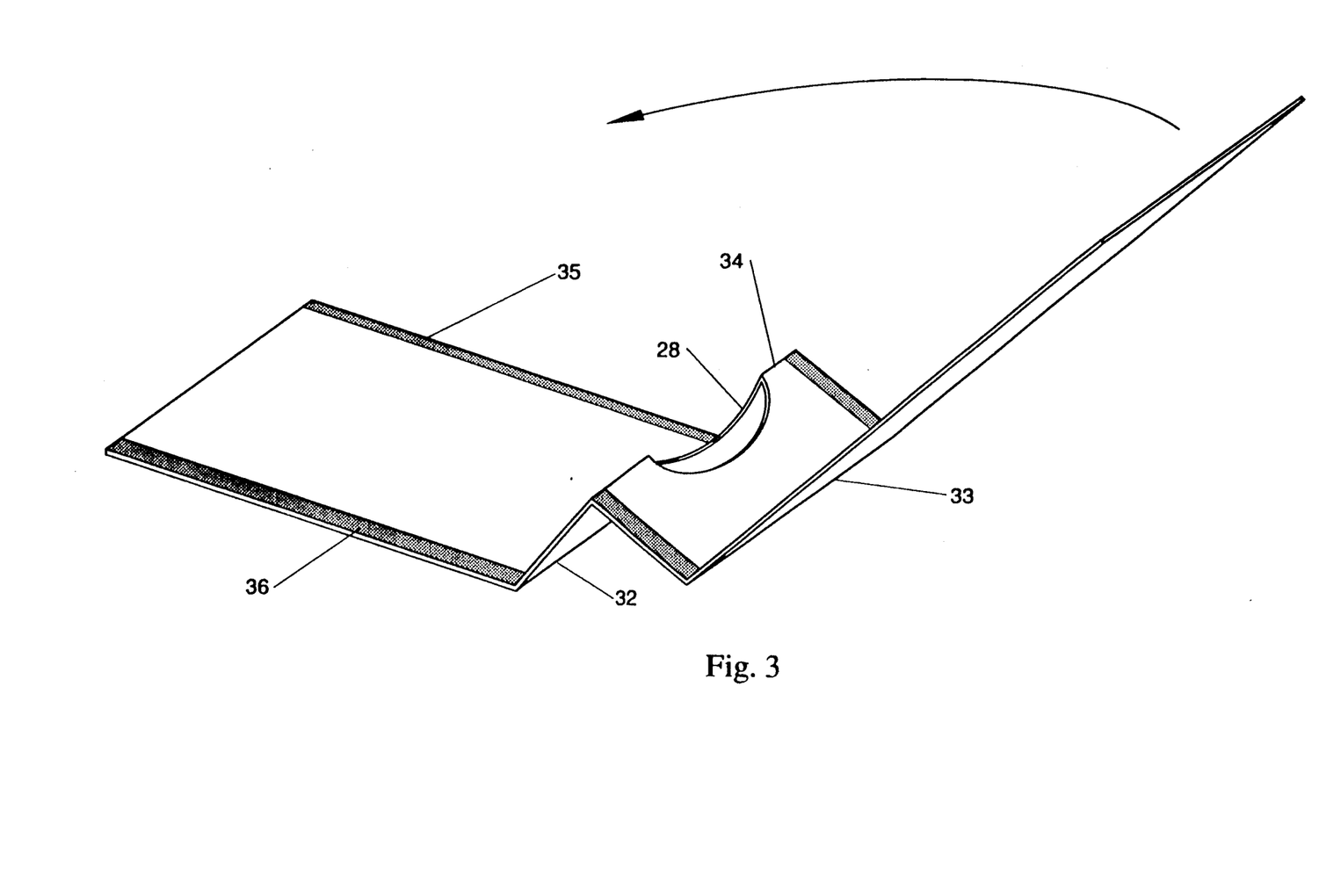
FIG. 3 is a perspective view of a blank of flexible film material being folded to form the flexible bag of the embodiment of FIG. 1.

The illustrated bag 22 is an oval flexible bag formed from a sheet of flat flexible material, as seen in FIG. 3. The particular sheet material selected for the flexible bag 22 will, of course, be dependent upon various factors, including the viscous product to be dispensed, the expected shelf life, the anticipated strength needs, and the type of sealing operations to be employed. Examples of materials include, a flat flexible sheet of polyethylene having a thickness of about 0.002 inches, and a flat flexible sheet of ethylene vinyl alcohol having a thickness of about 0.001 inch. One particularly preferred flat flexible sheet material (especially for products requiring receptacles 20 with various barrier properties such as dentifrices) is a multi-layered laminate film including the following layers, listed in the order of outer layer to inner layer:

1. Linear low density polyethylene—about 0.0005 inch;
2. Metalized aluminum coating—thickness incapable of measurement by conventional means;
3. White adhesive (such as may be purchased from Morton of Providence, R.I. as AD112);—about 1.5 pounds/432,000 square inches;
4. Polyethylene terephalate—about 0.00036 inch;
5. Clear adhesive (such as may be purchased from Morton of Providence, R.I. as AD100)—about 1.5 pounds/432,000 square inches; and
6. Linear low density polyethylene—about 0.0005 inch.

Continuing with FIG. 3, a centrally located aperture 28 is cut into the flexible sheet and the flexible sheet is folded as indicated into an "W"-type configuration along fold lines 32, 33 and 34. Once folded flat, the sheet material is then sealed along the side areas, 35 and 36, to form side seams and to provide the flexible bag 22 with a gusset at the top end around the aperture 28. Although the side seams are preferably heat sealed, sealing can be effected in other ways, e.g., utilizing adhesives. In any event, sealing the seams of the flexible bag 22 in this flat configuration makes sealing easy and reliable because pressure may be evenly applied to the entire seal area simultaneously. In the typical manufacturing situation, many flexible bags 22 would likely be formed and sealed concurrently from a single large sheet of flexible material and then the flexible bags 22 would be cut apart.

Returning to FIG. 2, the flexible bag 22 includes a rigid fitment 38 which provides a dispensing passage 40 through which product may be dispensed. As used herein to describe the fitment 38, the term "rigid" is merely intended to convey that the fitment 38, either independently or in combination with other components of the package 30 to which the fitment 38 is attached (e.g., the squeeze bottle, the support frame, or both), must be able to withstand the tendency of the fitment 38 to collapse as pressure is exerted on the receptacle 20 during normal dispensing.

Figure 4:
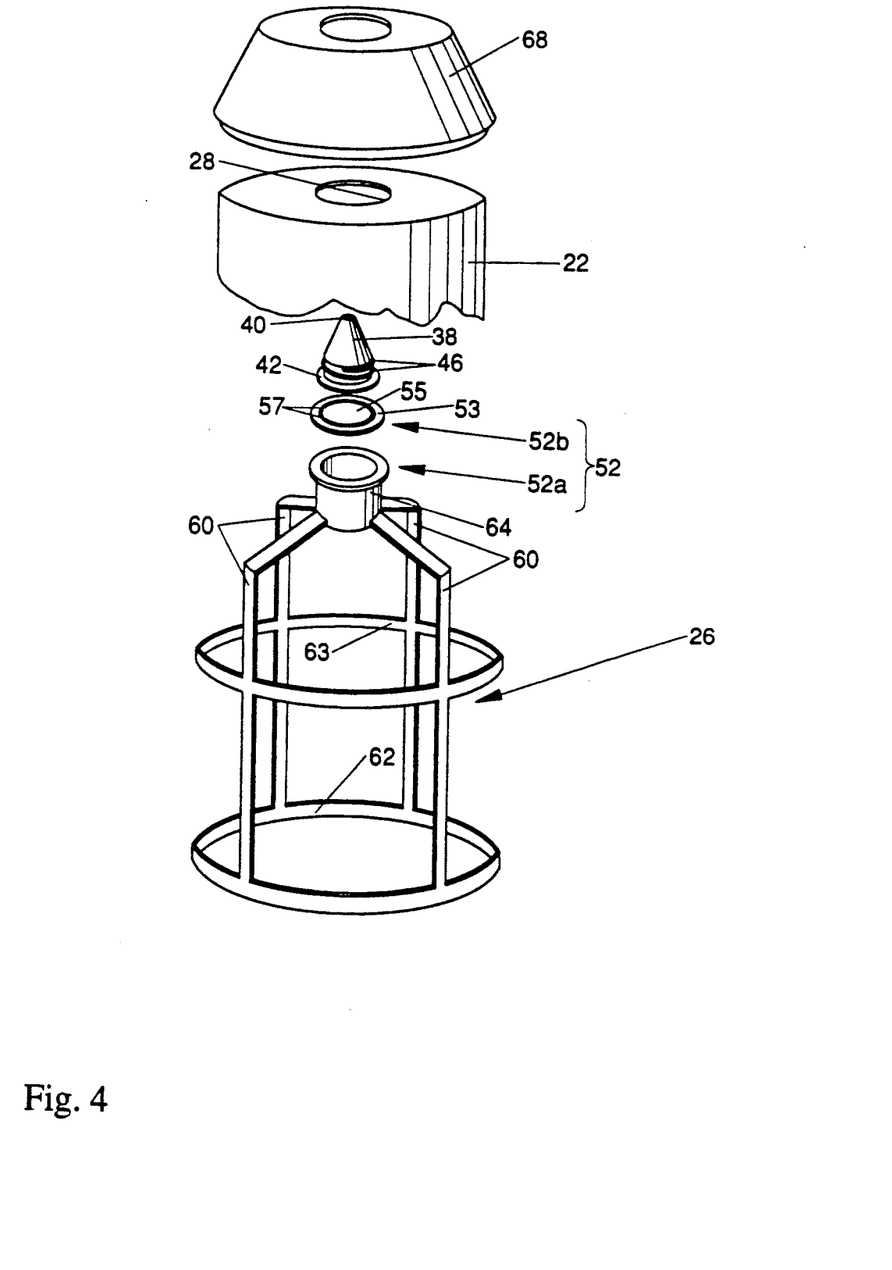
FIG. 4 is an exploded perspective view of the receptacle of FIG. 1.

The illustrated rigid fitment 38 has an annular flange 42 (seen best in FIG. 4). The annular flange 42 has a flat upper surface which is sealingly attached to the flexible material of the bag 22 around the centrally located aperture 28. Once again, heat sealing is preferred and the sealing operation is made easy and reliable by sealing to the flat upper surface of the flange 42 of the rigid fitment 38. Thus, all of the sealing operations of the flexible bag 22 may be performed on surfaces which enable the uniform application of sealing pressure.

Once the rigid fitment 38 is attached, the flexible bag 22 may be filled with product through the bottom end of the flexible bag 22 which has not yet been sealed. The bottom end of the flexible bag 22 may then be sealed (after filling) by twisting together the flexible material near the bottom end and applying heat to form a heat seal 44, thereby sealing the bottom end of the flexible bag 22.

Figure 9:
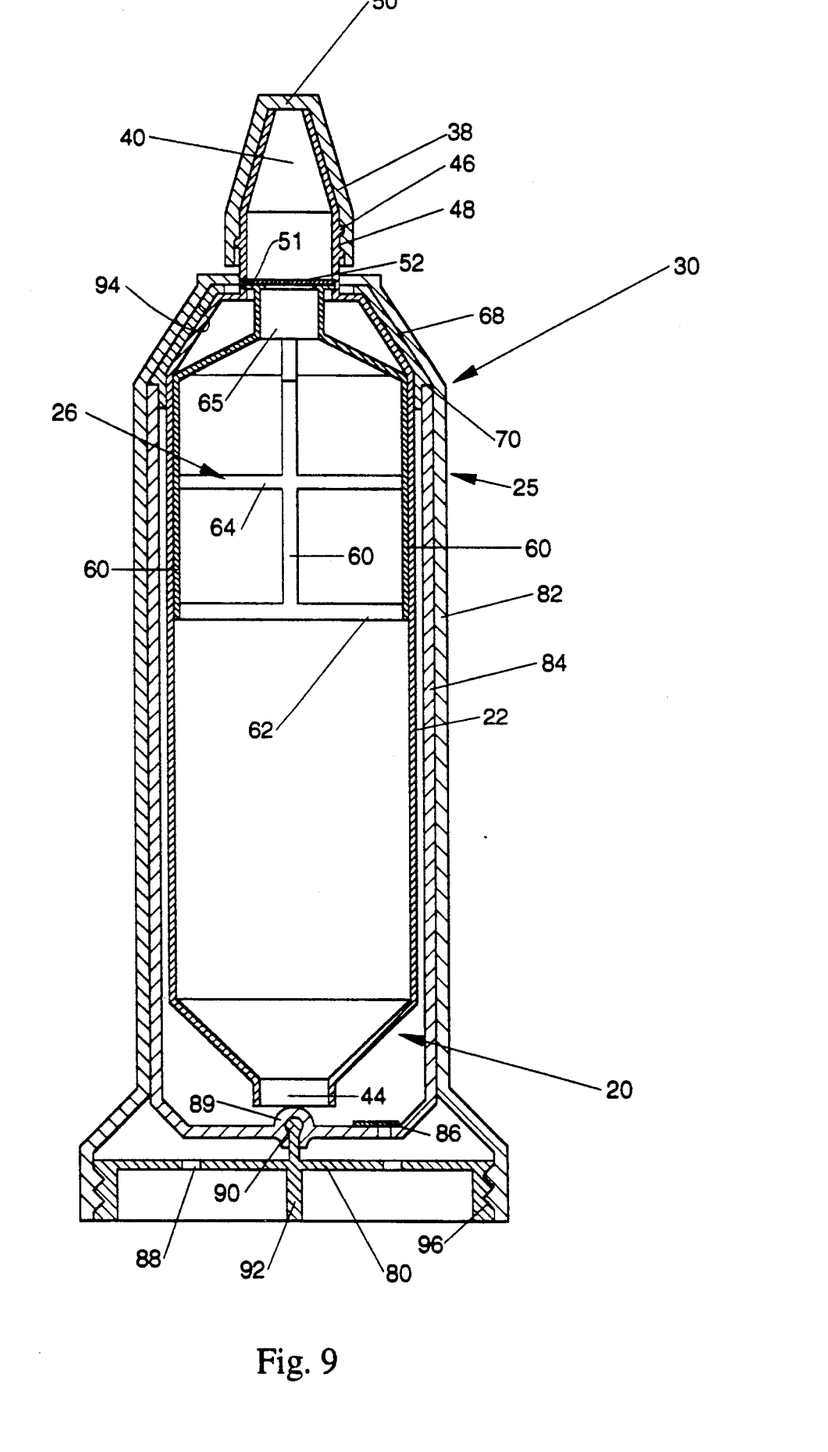
FIG. 9 is a cross-sectional view of the package of FIG. 8, taken along line 9—9 of FIG. 8 and housing the receptacle of FIG. 1.

Externally, the rigid fitment 38 of this embodiment is shaped as a nozzle and includes screw threads 46. As seen in FIG. 9, these screw threads 46 cooperate with screw threads 48 on a closure 50 to enable repeated opening and resealing of the receptacle 20. Although screw threads 48 are preferred, any suitable means for repeatedly sealing a closure 50 on the rigid fitment may be utilized; e.g., a snap-fit arrangement or a flip-top cap. The screw-on cap 50 may be provided as a part of the receptacle 20. Alternatively, the screw-on cap 50 may be part of the reusable portions of a refillable package 30. In the latter alternative, the receptacle 20 may be initially sealed (e.g., during shipment) by another separate means for sealing the dispensing passage 40. For example, as seen in FIG. 1, a thin film material 24 may be attached to the end of the rigid fitment 38 to seal the dispensing passage 40. This thin film material 24 is preferably larger than the dispensing passage 40 such that a grasping tab is provided.

Internally, (returning to FIG. 2) the rigid fitment 38 includes a circumferential recessed groove 51 in the side of the dispensing passage 40. This recessed groove 51 serves to hold a suckback valve 52. Referring to FIG. 4, the suckback valve 52 is made up of two components; an orifice plate 52a and a flapper plate 52b. The flapper plate 52b includes an outer annular portion 53 and an inner disk portion 55. The inner disk portion 55 is attached to the outer annular portion 53 via two resilient members 57 spaced radially from each other. The flapper plate 52b can be made, for example, of polyethylene and could have a thickness of 0.023 inch, a disk portion 55 diameter of about 0.5 inch, an annular portion 53 about 0.62 inch wide and spaced about 0.06 inch away from the disk portion 55, and the radial connecting members 57 could have a width of 0.04 inch and be spaced from each other about 25 degrees.

The illustrated orifice plate 52a is simply a circular plate having an orifice therein so that the plate 52a appears as an annular ring. The orifice in the orifice plate 52a is of slightly smaller diameter than the diameter of the disk portion 55. For the dimensions given above, the orifice may have a diameter of about 0.475 inch. When the flapper plate 52b is superjacent the orifice plate 52a the suckback valve 52 is formed. These two parts 52a and 52b are placed inside the rigid fitment 38 where they snap fit into the circumferential recessed groove 51 seen in FIG. 2.

Of course, the suckback valve need not be in that portion of the dispensing passage 40 which passes through the rigid fitment 38. In another embodiment (not seen), the rigid fitment may be a simple annular ring surrounding a dispensing passage. The fitment may be used merely to attach the flexible bag to the squeeze bottle. Thus, the receptacle may be provided without a nozzle and/or a suckback valve. These parts (i.e., the nozzle and/or the suckback valve) may be provided as part of a reusable package. Therefore, the suckback valve need not be in that portion of the dispensing passage inside the rigid fitment; it only needs to be located somewhere in the dispensing passage.

In the illustrated embodiment, the support frame 26 and the orifice plate 52a are a single integral piece wherein the support frame 26 depends from the orifice plate 52a. Many alternative configurations are possible, however. For example, (not seen) the support frame and the rigid fitment could be molded as a single integral piece with the support frame depending from the underside of the annular flange of the rigid fitment. In other alternatives, (not seen) the support frame may be a completely separate piece attached to, e.g., the rigid fitment and/or the orifice plate.

Figure 8:
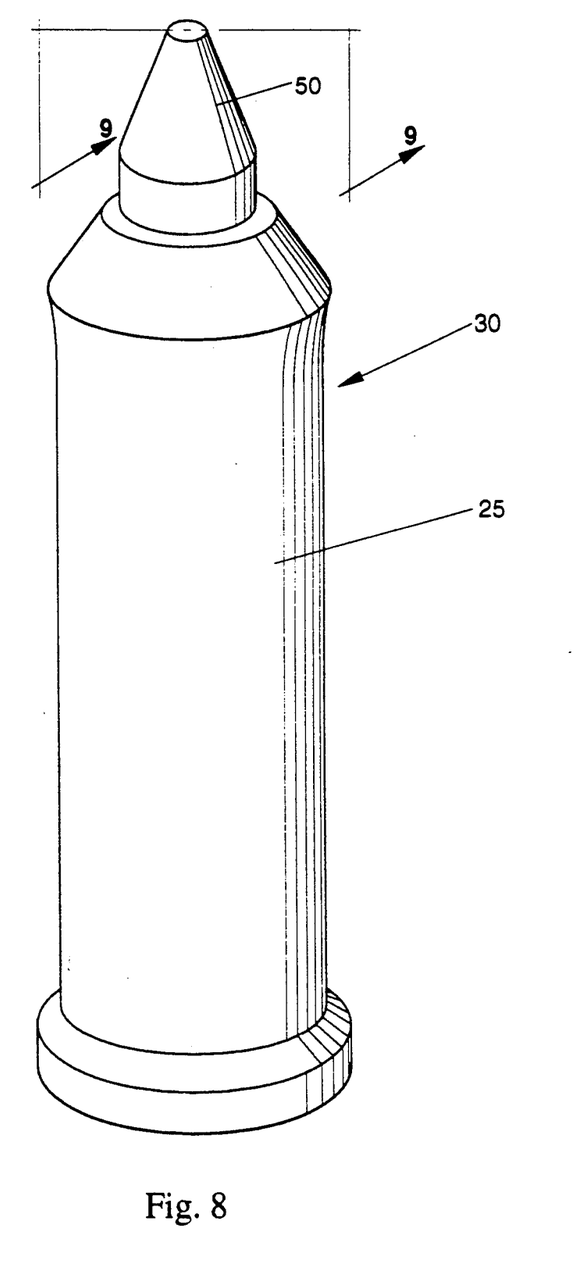
FIG. 8 is a perspective view of a particularly preferred resilient squeeze bottle package of the present invention wherein the receptacle of FIG. 1 or the receptacle of FIG. 5 may be utilized.

Referring to FIG. 8, the resiliently deformable support frame 26 is adapted to maintain substantially the entire upper half of the flexible bag 22 in substantially its original, filled shape between dispensing operations without attachment of the receptacle 20 to the squeeze bottle 25 near the midpoint of the flexible bag 22. During a dispensing operation, the support frame 26 is readily deformable so that the squeeze bottle 25 may be squeezed either adjacent the top portion or the bottom portion of the flexible bag 22, or both. In fact, it is highly preferred that the support frame 26 does not add appreciably to the squeezing force necessary to dispense a product. When the squeezing force is released the support frame 26 is resilient enough to return to its original shape (possibly with help from the squeeze bottle 25 as discussed hereinafter).

In addition, (at least for oval configurations) the support frame 26 is preferably sized and configured such that its outer most shape and size corresponds substantially to the inner shape and size of the resilient squeeze bottle 25. In other words, the exterior surfaces of the support frame 26 are located in substantially contacting relation (either directly or indirectly via the flexible bag) with the interior surface of the resilient squeeze bottle 25. Although substantially contacting, an airtight seal is not necessarily formed between the support frame 26 and the inner surface of the side wall of the squeeze bottle 25 at the midpoint. In fact, it may be desirable in some instances to ensure an airtight seal is not formed. This may be accomplished by providing recessed portions (not seen) in the support frame.

It has been found that this substantially contacting configuration is preferred because the squeeze bottle 25 and support frame 26 are deformed as product is dispensed. As the resilient squeeze bottle 25 returns to its original shape, the squeeze bottle 25 helps push the resilient support frame 26 back to its original shape when the two parts are in substantially contacting relation (at least when squeeze bottles with oval cross-sections are used). Consequently, the stiffness of the support frame 26 may be significantly reduced which makes squeezing easier; particularly in the upper half of the squeeze bottle 25.

Returning to FIG. 4, the illustrated support frame 26 is generally oval and is made of a single integral part which includes at least two longitudinal members 60. However, the support frame 26 utilizes four longitudinal members 60, and at least four longitudinal members 60 are preferred. The distal ends of these longitudinal members 60 are attached to and equally spaced around a lower annular ring 62. The middle of these longitudinal members 60 are attached to and equally spaced around an intermediate annular ring 63. The upper ends of the longitudinal members 60 are attached to each other via a cylindrical wall 64. Thus, the support frame 26 of this embodiment forms a bird cage configuration. As indicated above, many possible configurations are possible at the upper end of the longitudinal members 60; provided, the upper ends do not block the flow of product out through the dispensing passage 40.

Returning to FIG. 2, the support frame 26 of this embodiment is located inside the flexible bag 22 which eliminates the necessity of attaching the support frame 26 to the flexible bag 22. The elimination of this step can provide significant manufacturing and cost benefits. However, given different flexible bag 22 characteristics it may be desirable in some instances to at least tack the flexible bag 22 to the support frame 26. Even in these instances, this configuration (i.e., support frame 26 inside the flexible bag 22) offers advantages. For example, heat or sonic energy can be supplied from the outside to bond the flexible bag 22 to the support frame 26, rather than needing to be supplied from the inside of the flexible bag 22.

The inner receptacle 20 also includes a shoulder portion 68. The shoulder portion is attached to the flexible bag 22 and rigid fitment 38. The shoulder portion 68 provides a transition from the rigid fitment 38 to the expanded flexible bag 22. More importantly, the shoulder portion 68 of this embodiment includes a downwardly facing ledge 70. This ledge 70 provides a means for cooperating with the squeeze bottle 25 (seen in FIG. 9) to sealingly retain the receptacle 20 in the squeeze bottle 25. Preferably, this means provides for releasable sealing so that the receptacle 20 may be used with a reusable squeeze bottle 25 as discussed more fully hereinafter.

Figure 5:
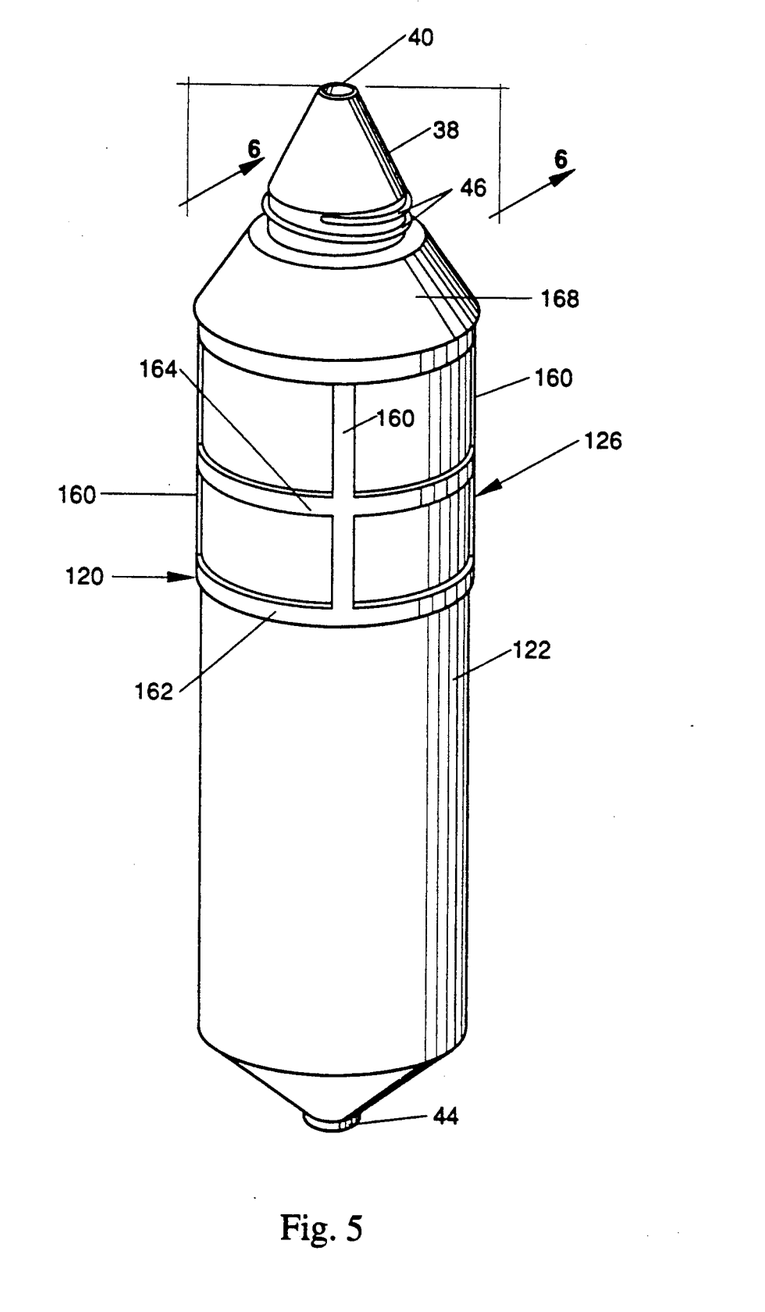
FIG. 5 is a perspective view of a second preferred embodiment of the present invention wherein the inner receptacle of the present invention wherein the support frame is located outside the flexible bag.
Figure 6:
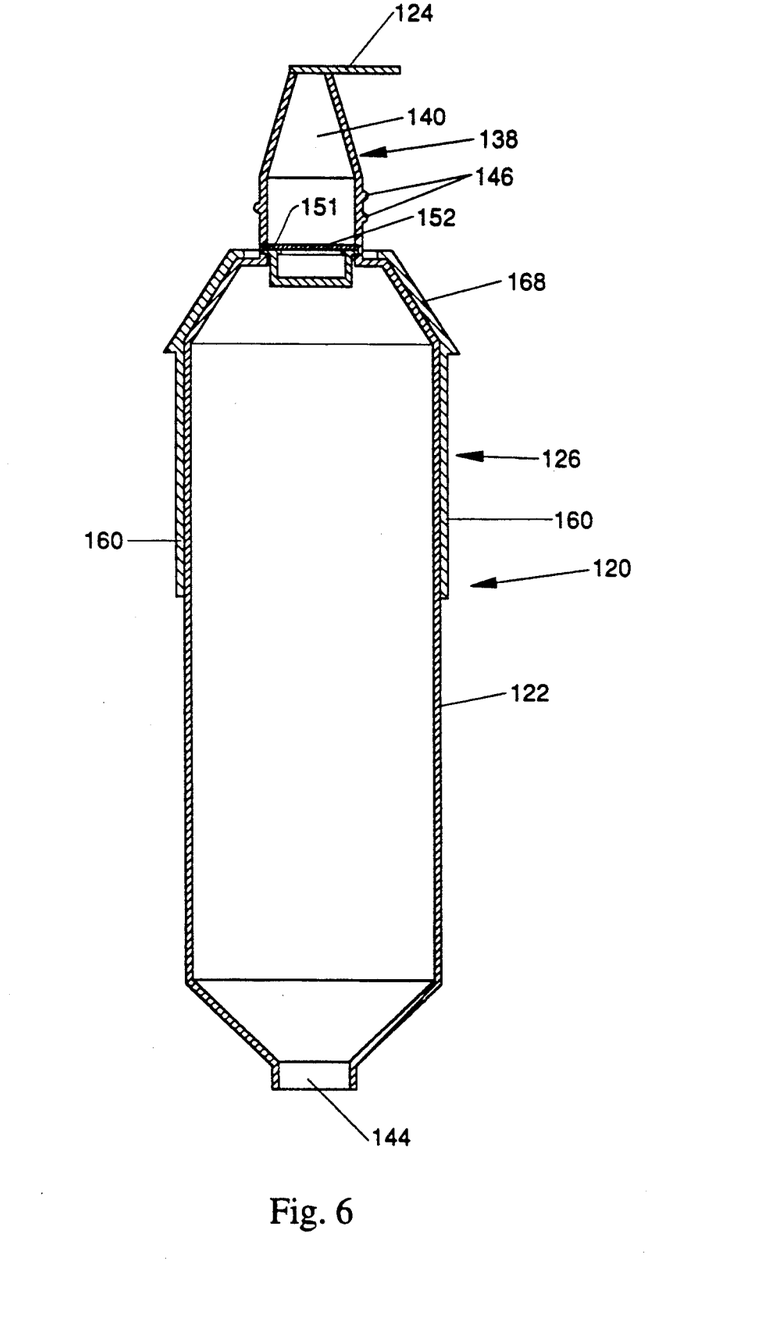
FIG. 6 is a cross-sectional view of the receptacle of FIG. 5, taken along line 6—6 of FIG. 5.

FIGS. 5 and 6 illustrate another preferred inner receptacle, indicated generally as 120. This inner receptacle 120 is very similar to the receptacle 20 of FIGS. 1 and 2. However, unlike the previous embodiment, the support frame 126 is located outside the flexible bag 122 and is integrally formed with the shoulder piece 168. The support frame 126 is attached to the outside of the bag 122 sufficiently to prevent the top half of the flexible bag 122 from collapsing. Otherwise, portions of the top half of the flexible bag 122 may pull away from the support frame 126 such that complete bag 122 inversion is prevented. Thus, the flexible bag 122 is preferably attached to the support frame 126 along all longitudinal members 160 and around all rings 162 and 164. Any suitable attachment means may be employed to attach the flexible bag 122 to the support frame 126. For example, double sided adhesive tape, tape wrapped externally around the support frame 126 and the flexible bag 122, hot melt adhesive, or heat sealing may be used. In any case, the attachment means must be sufficiently strong that the flexible bag 122 will not separate from the support frame 126 during normal use so that bag 122 inversion is prevented.

Figure 7:
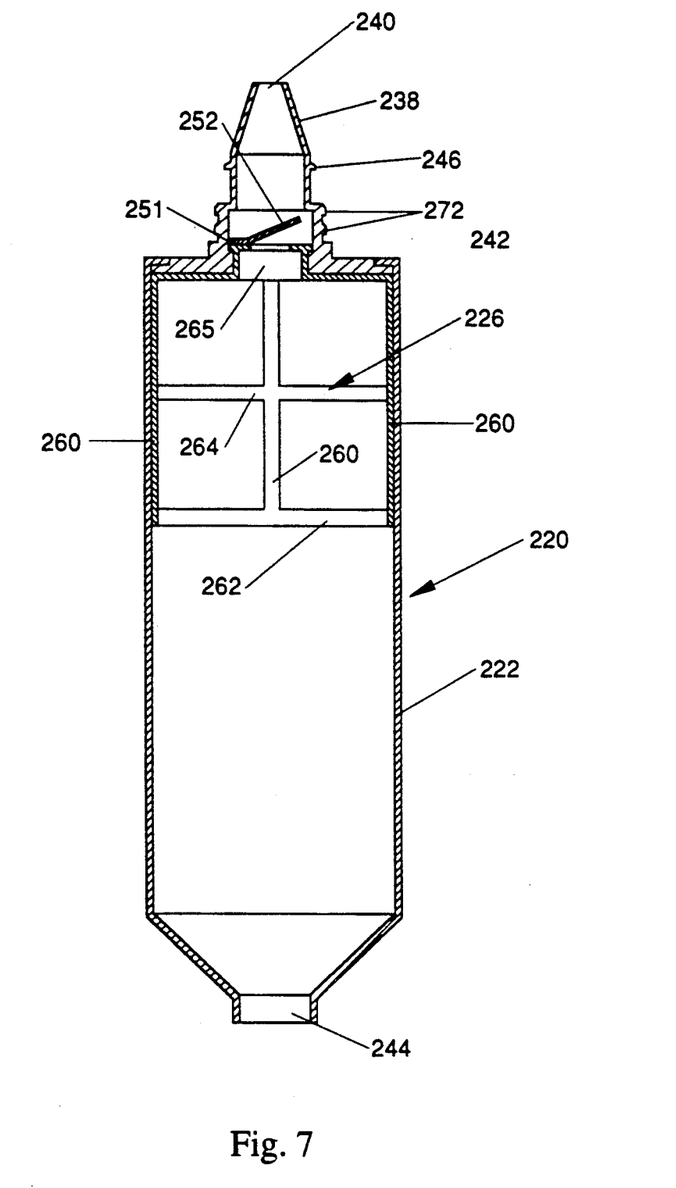
FIG. 7 is a cross-sectional view similar to FIGS. 2 and 6 of a third preferred embodiment of an inner receptacle of the present invention.

Referring to FIG. 7, another preferred embodiment of an inner receptacle, indicated generally as 220, is illustrated. The flexible bag 222 is substantially the same as the flexible bag 22 previously discussed. The rigid fitment 238, however, includes additional externally located threads 272 which cooperate with threads 274 on a collar 276 (seen in FIG. 13) to sealingly attach the rigid fitment 238 to the squeeze bottle 225 (also seen in FIG. 13) at its top end. Thus, the additional threads 272 provide a means for cooperating with the squeeze bottle 225 to repeatedly seal the top end of the receptacle 220 in the squeeze bottle 225. Preferably, this means provides for releasable sealing so that the receptacle 220 may be used in a reusable squeeze bottle 225. More preferably, the means are screw threads 272 which provide a reliable resealing mechanism. However, means other than screw threads 272 may be used, e.g., a snap-fit arrangement.

Although receptacles of this invention offer advantages in all contexts, these receptacles are particularly suitable for use as a refill receptacle in a reusable resilient squeeze bottle package of the present invention. Although the inner receptacles discussed previously herein, 20, 120, and 220, preferably utilize the support frame as described above, other means to maintain the top half of the flexible bag in substantially its fully expanded position such that the flexible bag inverts upon emptying may be utilized.

A particularly preferred oval reusable resilient squeeze bottle package of the present invention, indicated generally as 30, which may utilize the receptacle 20 of FIGS. 1 and 2, or the receptacle 120 of FIGS. 5 and 6 is illustrated in FIGS. 8 through 11. For simplicity, this package 30 is discussed and illustrated herein utilizing the receptacle 20 of FIGS. 1 and 2.

Referring to FIG. 9, this particularly preferred reusable squeeze bottle 25 enables replacement of the receptacle 20 while having only one closure member (i.e., end plate 80) which must be manipulated by the user. This single closure member 80, located at the bottom of the squeeze bottle 25 is all that is needed to seal the receptacle 20 at the bottom and the top within the reusable squeeze bottle 25.

Figure 10:
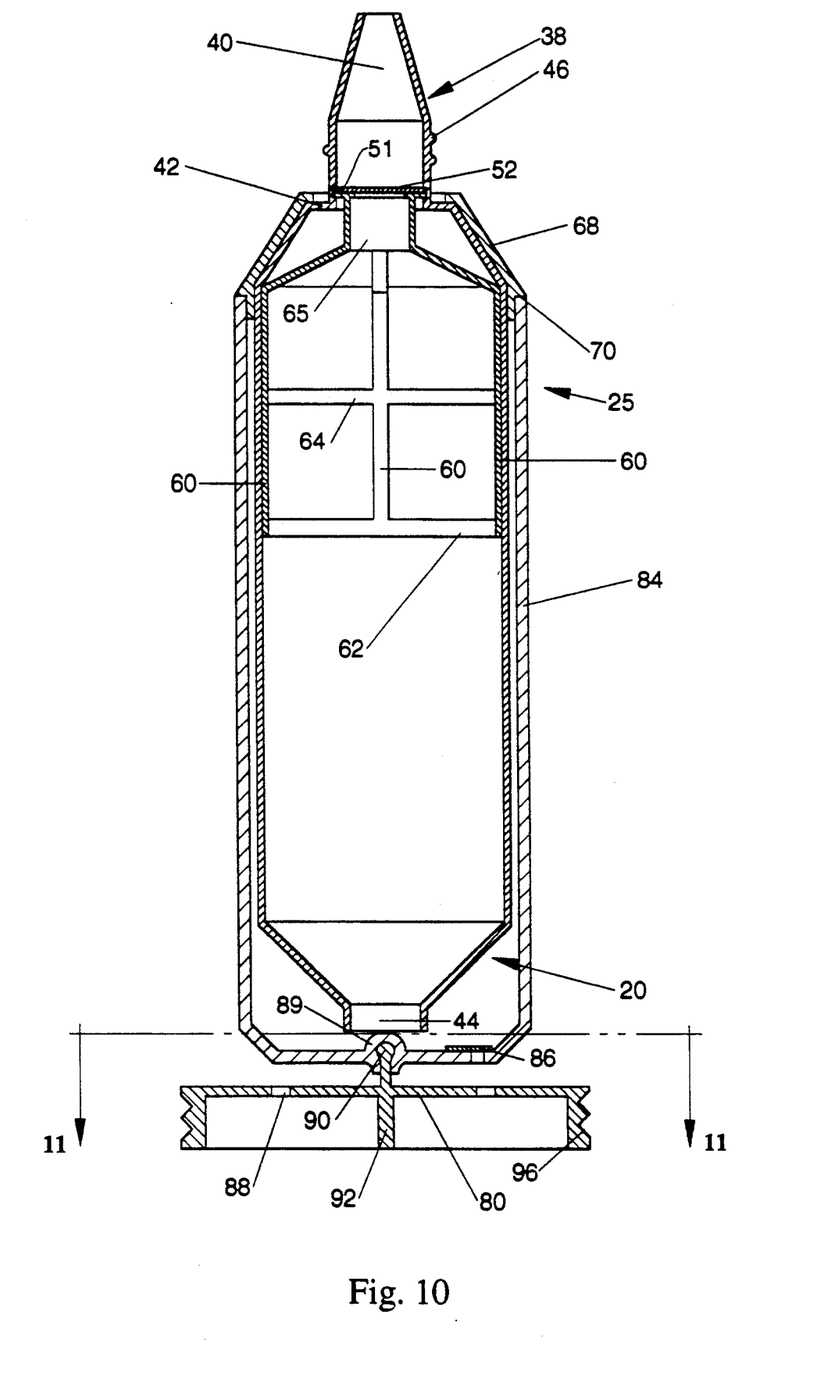
FIG. 10 is a cross-sectional view similar to FIG. 9 showing only the receptacle and the inner sleeve.

The package 30 generally includes an outer sleeve 82, an inner sleeve 84 and an inner receptacle 20. To install the inner receptacle 20 into the squeeze bottle 25, the receptacle 20 is first placed inside the inner sleeve 84, as seen in FIG. 10. The inner sleeve 84 is a hollow oval tubular section which has substantially the same external cross-sectional dimensions as the internal cross-sectional dimensions of the outer sleeve 82. The top edge of the inner sleeve 84 supports the receptacle 20 via the ledge 70 of the shoulder portion 68. The inner sleeve 84 of this embodiment also includes a thin film valve 86.

Figure 11:
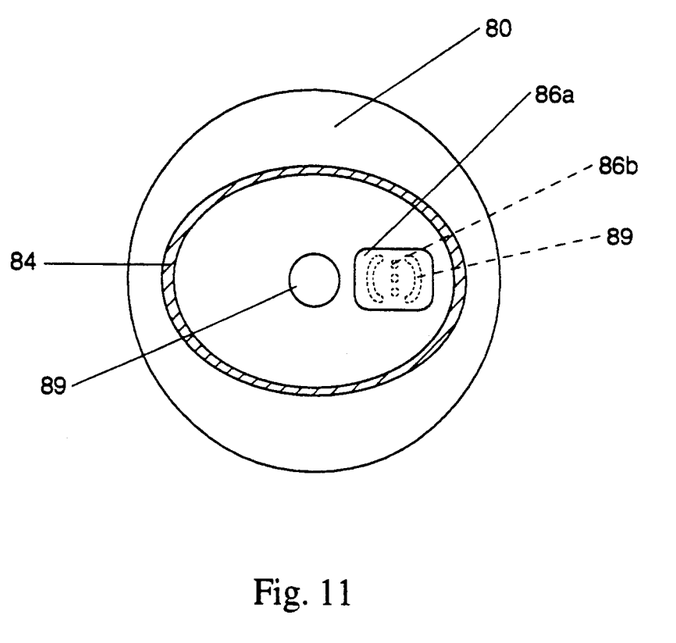
FIG. 11 is a cross-sectional view taken along line 11—11 of FIG. 10 illustrating the thin film vent valve.

Referring to FIG. 11, the thin film valve 86 is a valve formed by partially adhering a thin film 86a over an aperture or apertures 86b. In this embodiment, three apertures 86b aligned in a straight line are provided with a thin film 86a adhered to the bottom wall 87 of the inner sleeve 84 in two opposing crescent patterns 89. For the illustrated embodiment, the three apertures may have a diameter of 0.04 inch each and be separated from each other by about 0.06 inch (edge-to-edge). The apertures 86b may be overlayed by a 0.0005 inch thick film 86a of ethylene vinyl acetate centered over the apertures 86a and adhered to the end plate 80 in the opposing crescent pattern 89 having about 0.5 inch diameter and separated by about 0.15 inch.

Returning to FIG. 10, the threaded end plate 80 also includes apertures 88 which provide communication between the atmosphere and the thin film valve 86. The threaded end plate 80 is circular and attached to the oval inner sleeve 84 by a socket 89 and post 90 configuration. This allows the end plate 80 to be turned relative to the inner sleeve 84. A raised grasping ridge 92 is provided on the end plate 80 to facilitate grasping and turning thereof.

Alternatively, the inner sleeve 84 may be provided with apertures similar to those found in the end plate 80, or the inner sleeve 84 may have other openings (not seen). For example, it may be desirable to provide the inner sleeve 84 as a bird cage structure (not seen) similar to the support frame 26 to make the squeeze bottle 25 easier to squeeze. In this alternative, the thin film valve 86 could be located in the end plate 80, thereby sealing the receptacle 20 within the squeeze bottle 25.

Returning to FIG. 9, the inner sleeve 84 holding the receptacle 20 is placed inside the outer sleeve 82. The outer sleeve 82 has an upper frustroconical surface 94 located therein near its top end and screw threads 96 located near the bottom end. As the end plate 80 is tightened, the shoulder portion 68 is forced against the frustroconical surface 94. This provides an airtight seal between the upper edge of the inner sleeve 84 and the ledge 70 of the shoulder portion 68. Thus, the receptacle 20 is sealed inside the inner sleeve 84.

The utilization of screw threads 96 on the end plate 80 offer several advantages and are thus, preferred. For example, the utilization of screw threads 96 enables repeated effective sealing of the package 30. In addition, screw threads are preferred in this embodiment because they enable sealing of the receptacle 20 inside the squeeze bottle 25 at the top end without tolerances as tight as they may otherwise be on the length of the inner sleeve 84.

Figure 12:
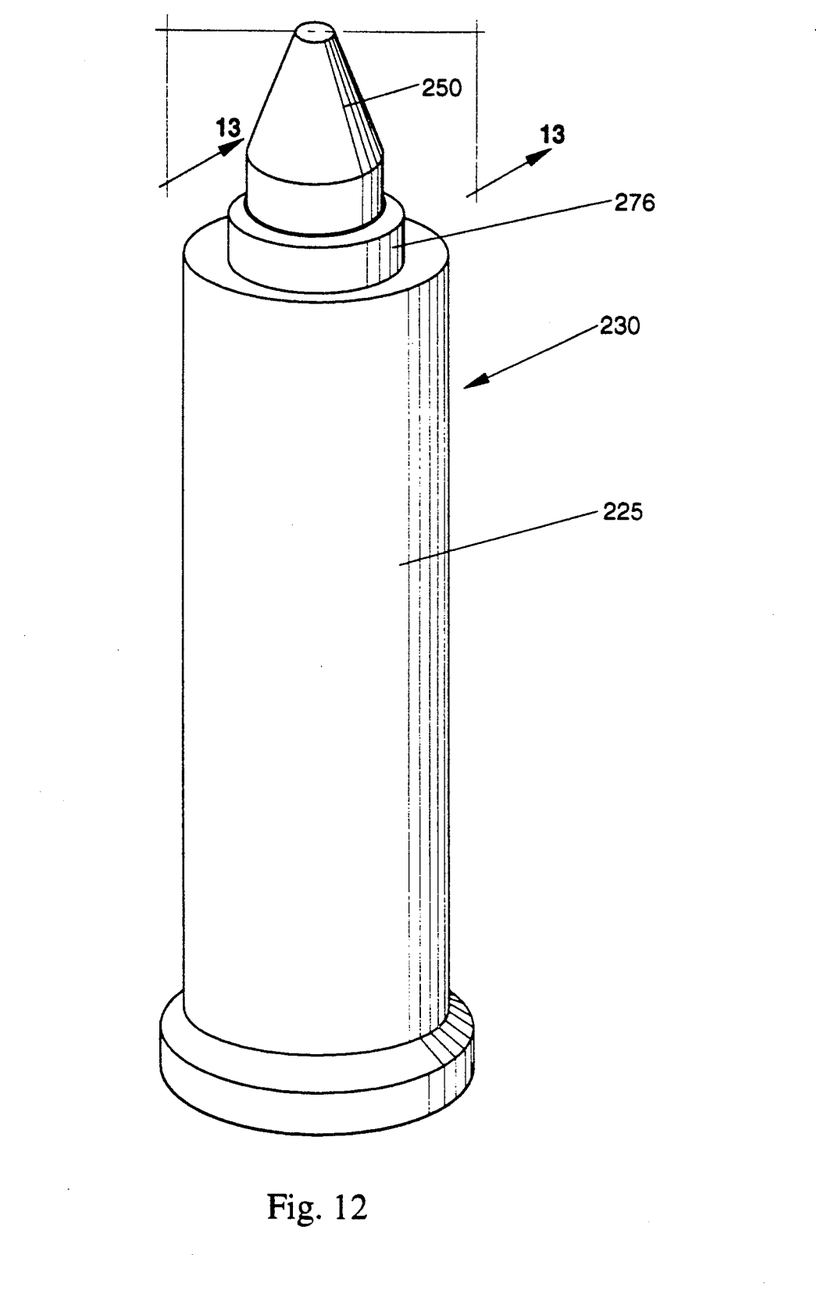
FIG. 12 is a perspective view of another preferred squeeze bottle package of the present invention wherein the receptacle of FIG. 7 may be utilized.
Figure 13:
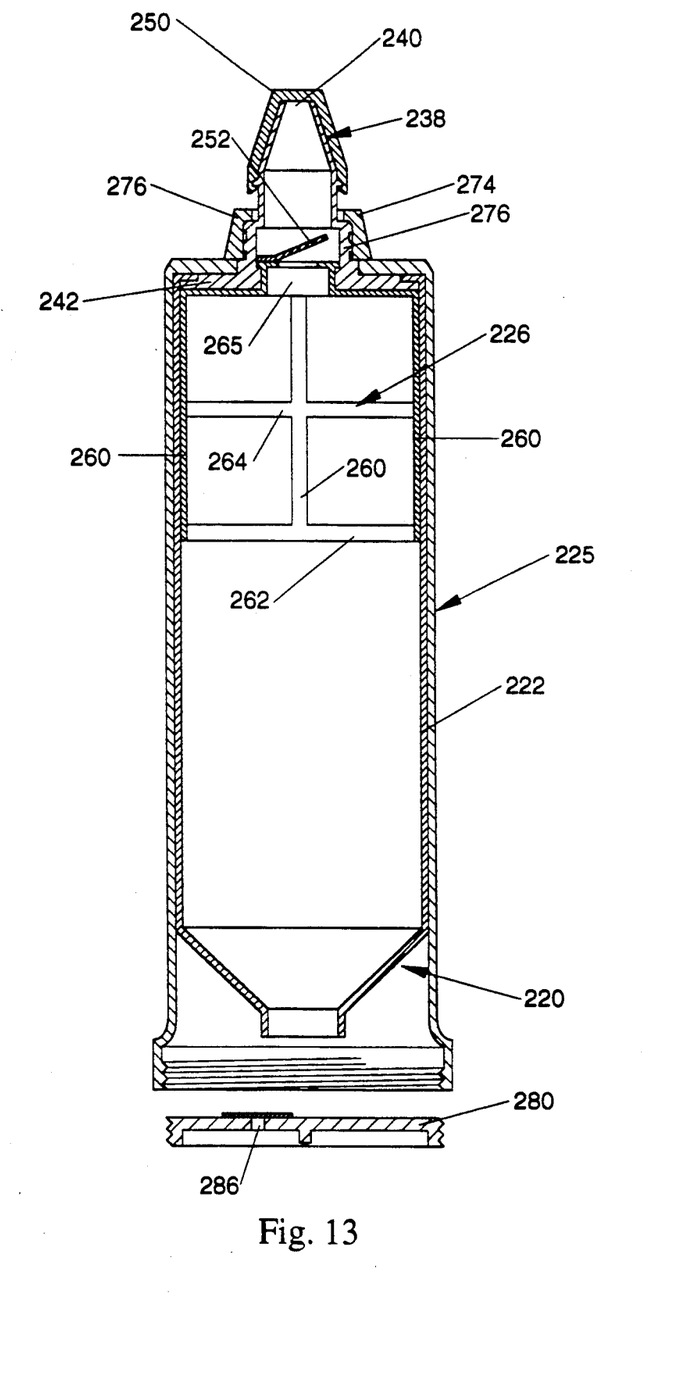
FIG. 13 is a cross-sectional view of the package of FIG. 10 taken along line 13—13 and housing the receptacle of FIG. 7.

A preferred oval reusable resilient squeeze bottle package 230 of the present invention which utilizes the receptacle of FIG. 7 is illustrated in FIGS. 12 and 13. This reusable embodiment utilizes a collar 276 to seal the top end of the receptacle 220 to the squeeze bottle 225. The receptacle 220 is dropped into the squeeze bottle 225 from the bottom end. This allows the secondary threads 272 to protrude through the top end of the squeeze bottle 225. The collar 276 is then screwed onto the threads 272, sealing the top end of the receptacle 220 to the top end of the squeeze bottle 225. The end plate 280 is screwed onto the bottom end of the squeeze bottle 225 until it forms a seal at the bottom end against the inner surface of the squeeze bottle 225. The end pl ate 280 includes a thin film valve 286 similar to that of the inner sleeve of FIG. 11.

All of the resilient squeeze bottle packages of the present invention work essentially the same. For simplicity, the general operation of these packages will be discussed with regard to the package of FIGS. 12 and 13. After removal of the cap 250 the resilient side wall of the squeeze bottle 225 is squeezed. This squeezing causes the thin film valve 286 to close. Air in the space between the receptacle 220 and the squeeze bottle 225 is compressed; the flexible bag 222 is compressed; and the support frame 226 is compressed. This causes product within the flexible bag 222 to force the disk portion 55 of the flapper plate 52b off of its resting place on the orifice plate 52a; thereby opening the suckback valve 252. Product passes out of the package 230 through the dispensing passage 240.

As the squeezing force is released, the side wall of the squeeze bottle 225 returns to its original shape and product flows back into the dispensing passage 240 until the suckback valve 252 closes. Simultaneously, as the side wall of the squeeze bottle 225 returns to its original shape it helps push the support frame 226 back to its original shape. Consequently, the top half of the bag 222 returns to its original shape and the bottom half of the flexible bag 222 begins collapsing. Air is allowed to enter the space between the receptacle 220 and the squeeze bottle 225 through the thin film valve 286. Successive dispensing operations result in the bottom half of the flexible bag 222 inverting inside the top half of the flexible bag 222. The inversion enables substantially all of the product within the flexible bag 222 to be dispensed.

Although particular embodiments of the present invention have been shown and described, modification may be made to the receptacles without departing from the teachings of the present invention. Accordingly, the present invention comprises all embodiments within the scope of the appended claims.

What is claimed is:

1. A squeeze bottle package including a reusable outer squeeze bottle and a replaceable inner receptacle, the inner receptacle including a flexible bag having a dispensing passage, the flexible bag being adapted to house a viscous product and the inner receptacle being adapted to cause the flexible bag to invert upon itself substantially about its midpoint, the squeeze bottle comprising:

(a) an outer squeeze bottle having a resiliently deformable side wall, an opening at the top end of the squeeze bottle adapted to accommodate the dispensing passage of the inner receptacle, and an opening at the bottom end of the squeeze bottle adapted to permit insertion of the entire inner receptacle therethrough when the inner receptacle is completely full of product;

(b) a single closure means comprising a screw on end plate which is attached to an inner sleeve which extends to the top end of the package to push the top end of the inner receptacle against an interior surface of the squeeze bottle when screwed onto the bottom end of the package; and (c) a vent valve located in the outer squeeze bottle and adapted, when the inner receptacle is sealed therein, to substantially prevent air between the inner receptacle and the squeeze bottle from exiting the package when a squeezing force is applied to the resilient side wall so that produce is dispensed from the package through the discharge passage, and the vent valve being adapted to permit air to enter the space between the inner receptacle and the squeeze bottle upon release of the squeezing force.

2. A squeeze bottle package according to claim 1, wherein the inner sleeve has an outer cross-sectional dimension substantially equal to the inner cross-sectional dimension of the outer squeeze bottle.

3. A squeeze bottle package according to claim 1, wherein the vent valve is located on the inner sleeve.

4. A squeeze bottle package according to claim 2, wherein the vent valve is located on the inner sleeve.

* * * * *